United States Patent
Sullivan, Jr.

(10) Patent No.: US 6,247,600 B1
(45) Date of Patent: Jun. 19, 2001

(54) PAINT STRAINER

(75) Inventor: Joseph J. Sullivan, Jr., Scituate, MA (US)

(73) Assignee: CDF Corporation, Plymouth, MA (US)

( * ) Notice: Subject to any disclaimer, the term of this patent is extended or adjusted under 35 U.S.C. 154(b) by 0 days.

(21) Appl. No.: 09/433,414

(22) Filed: Nov. 4, 1999

Related U.S. Application Data

(63) Continuation of application No. 29/106,174, filed on Jun. 10, 1999.

(51) Int. Cl.$^7$ .................................................. B01D 29/05
(52) U.S. Cl. ........................ 210/474; 210/464; 210/469; 222/189.06
(58) Field of Search .................................. 210/473–474, 210/464, 469, 475–477; D7/667–668; 222/189.06, 189.07, 189.09

(56) References Cited

U.S. PATENT DOCUMENTS

| | | |
|---|---|---|
| D. 107,540 | 12/1937 | McHale . |
| D. 185,399 * | 6/1959 | Tupper . |
| D. 286,268 | 10/1986 | Wolff ........................................ D9/447 |
| D. 323,296 | 1/1992 | Schoenthaler ........................ D9/456 |
| D. 359,202 * | 6/1995 | Cousins et al. . |
| D. 360,929 | 8/1995 | Albertson ............................. D23/209 |
| D. 362,804 | 10/1995 | Warren ................................. D9/436 |
| D. 379,302 | 5/1997 | Rodman ............................... D9/440 |
| D. 419,874 * | 2/2000 | Smith . |
| 1,051,735 | 1/1913 | Hammond . |
| 1,119,255 * | 12/1914 | Durkin . |
| 1,994,335 | 3/1935 | Churan ................................. 220/90 |
| 2,070,998 | 2/1937 | Odom ................................. 210/149 |
| 2,239,132 | 4/1941 | Ware .................................... 210/155 |
| 2,250,646 | 7/1941 | Metsch ................................. 210/159 |
| 2,315,842 | 4/1943 | Dariano ............................... 210/158 |
| 2,436,924 | 3/1948 | Hansen .................................. 211/65 |
| 2,667,976 | 2/1954 | Weidner ............................... 210/156 |
| 2,883,057 | 4/1959 | Richards .............................. 210/476 |
| 3,170,875 * | 2/1965 | Sweet . |
| 3,263,817 | 8/1966 | Buckley ............................... 210/388 |
| 4,025,435 | 5/1977 | Shea ..................................... 210/250 |
| 4,066,557 | 1/1978 | Banoczi ............................... 210/470 |
| 4,290,888 | 9/1981 | Gartmann et al. .................. 210/356 |
| 4,362,624 | 12/1982 | Ueda ................................. 210/497.2 |
| 4,622,146 | 11/1986 | O'Brien ............................... 210/469 |
| 4,731,177 | 3/1988 | Hemman ............................... 210/86 |
| 4,804,470 | 2/1989 | Calvillo et al. ..................... 210/232 |
| 4,816,148 * | 3/1989 | Hemman ............................. 210/256 |
| 5,012,960 | 5/1991 | Arnold ................................. 222/570 |
| 5,186,828 * | 2/1993 | Mankin ............................... 210/232 |
| 5,221,475 * | 6/1993 | Mealey et al. ...................... 210/474 |
| 5,368,728 | 11/1994 | Reaves ................................. 210/232 |
| 5,914,036 | 6/1999 | Sullivan, Jr. ........................ 210/232 |
| 6,076,450 * | 6/2000 | DiGiorgio, Jr. . |

FOREIGN PATENT DOCUMENTS

| 21929 | 11/1914 | (GB) . |
|---|---|---|
| 564843 * | 1/1944 | (GB) . |

* cited by examiner

*Primary Examiner*—W. L. Walker
*Assistant Examiner*—Marianne S. Ocampo
(74) *Attorney, Agent, or Firm*—Pandiscio & Pandiscio

(57) ABSTRACT

A strainer device for use in straining a liquid such as paint from a container into an open receptacle. The strainer device comprises a side wall with a top end and a bottom end, an outwardly extending lip at its top end for engaging the top end of an open top container so as to support the strainer device in the open top of the container, and a screen mesh member fixed to a flange on the bottom end of said side wall. A selected portion of the side wall is indented from top to bottom so as to provide a channel along its length to permit introduction of an intake hose or other implement to a container in which the strainer device is suspended without having to first remove the strainer from the container.

12 Claims, 3 Drawing Sheets

PAINT STRAINER

This is a continuation of U.S. Design application Ser. No. 29/106,174, filed Jun. 10, 1999, for "Plastic Paint Strainer" (abanoned) which was succeeded by continuation application Ser. No. 29/113,506, filed Nov. 5, 1999, now U.S. Pat. No. Des. 432,421, issued Oct. 24, 2000.

FIELD OF THE INVENTION

The present invention relates to strainers that are mountable on containers into which paint or other liquid materials are to be strained, and more particularly to strainers for use with storage containers that are accessed by sprayer intake hoses.

DESCRIPTION OF THE PRIOR ART

Paint strainers used in conjunction with paint containers are known in the art. Currently available to the paint industry are filter socks, filters affixed to cardboard, filters affixed to paper funnels, and strainers that embody the invention of my U.S. Pat. No. 5,914,036.

Filter socks, are considered cumbersome to work with because they need to be manually stretched over a receptacle, i.e., a can or bucket, into which paint is to be poured from another can or bucket of paint. Once the sock has been pulled over the receptacle, the paint is then poured out of the can or bucket through the sock into the receptacle. In the case of a 5 gallon can or bucket of paint, this requires the operator to use one hand to hold the sock on the receptacle, leaving only one hand to pour 5 gallons, or approximately 50 lbs., of paint into the receptacle. For most people it is an awkward or difficult task to hold the container so as to control the flow of paint into the waiting container, with the result that frequently the straining process is messy due to spilling.

The filters affixed to cardboard are designed to sit on top of an empty container and allow paint from another container to be poured through the filter unit. Although this design solves the handling problem with the aforementioned sock, it has its drawbacks as well. The use of cardboard as one of its major components raises serious contamination issues and also increases costs. Many painters do not want their paint coming in contact with cardboard for fear of dust and dirt related problems. Also, the filter material is often stapled to the cardboard which does not provide a very reliable bond and also does not create a uniform seal around the diameter of the cardboard box. This allows for the possibility that paint can be poured between the filter and the cardboard, thus by-passing the filtering.(straining) process altogether. Lastly, although the base of this type of filtering apparatus sits on the lip of a container, the cardboard box extends well up above the height of the container it is sitting on. This results in a potentially unstable position; it may tip over if not filled properly.

A paint strainer of the type that comprises a paper funnel combined with a filter material also has practical problems. For one thing, the unit is not self-supporting and, therefore, has to be hand-held to be used. This makes it difficult to simultaneously hold the filter and pour material. A further problem is that its capacity is necessarily limited, thereby limiting the rate and efficiency of the straining process and making it impractical for use where larger volumes of paint are to be strained.

While it is desirable for strainers to be reusable, in practice most strainers are used only for one paint color and then replaced rather than risk discoloration of a second color with left-over traces of the first color. Accordingly, to save storage and shipping space, it is desirable for be able to stack paint strainers one upon the other in a nesting relationship. Certain of the foregoing types of paint strainers are not well suited for stacking one inside the other.

My U.S. Pat. No. 5,914,036 discloses a paint strainer which is adapted to be mounted in the top end of a paint container so that both hands of a painter may be used to pour the paint through the strainer and into the paint container. When mounted on a paint container, my strainer does not form a top-heavy assembly like prior designs of paint strainer designs, thereby assuring position stability during a paint-pouring operation. My design is sturdy and also offers the advantages of being relatively easy to make and adapted for stacking one inside of the other.

I have determined that it would be advantageous to be able to access a paint container with a paint sprayer intake hose without having to remove the strainer and without interfering with the manner in which the strainer is suspended from the rim of the container. This allows for successive refilling of the container without having to remove the intake hose from the container, which inevitably results in dripping paint outside of the paint container. Keeping the strainer suspended in the paint container provides the added benefit of having residual paint drip down from the strainer into the paint container. Such an arrangement also offers the advantage of saving time because the user does not have to (a) remove the sprayer intake hose in order to reapply the strainer to the container in order to strain a new supply of paint into the container, and (b) subsequently remove the strainer in order to reinsert the intake hose for further paint spraying. Keeping the strainer on top of the paint container also prevents unwanted contaminants, such as insects, paint chips, dirt and so forth, from falling into the strained paint.

SUMMARY OF THE INVENTION

The primary object of this invention is to improve upon the strainer disclosed and claimed in my U.S. Pat. No. 5,914,036.

Another object of the invention is to provide a strainer which is not only readily stackable so as to permit space-efficient shipping and storage, but also which need not be removed from a container filled with a strained liquid such as paint in order to permit an intake hose for a sprayer or other apparatus to be inserted into the container.

The foregoing objects are achieved according to the present invention by providing a novel strainer which is adapted particularly for straining and depositing liquid paint in an open container, but useful also in straining other liquid material. In the illustrated preferred embodiment of the invention, the strainer comprises a side wall having first portion that is convex in cross-section and a second portion that is concave in cross-section, with the first and second portions being joined to one another so that said side wall is continuous in cross-section, an inwardly-extending flange attached to the bottom end of the side wall, a screen or mesh fixed to the inwardly extending flange so as to close off the bottom end of the space encompassed by the side wall, and an outwardly extending lip formed integral with the top end of the side wall for suspending the strainer from the open top end of a container into which paint or some other liquid material is to be strained. The lip extends along the top margin of the convex portion of the wall and terminates at the junctions of the top margins of the convex and concave portions, so as to permit the strainer to be suspended by its lip portion from the top end of a container. This new form of strainer improves upon the strainer shown in my U.S. Pat. No. 5,914,036 in that the concave portion leaves an opening between the strainer and the container on which it is suspended that is large enough to permit an intake hose for a spraying apparatus to be extended into the container without need to remove the strainer from the container. At the same time the strainers provided by this invention are shaped so as to permit them to be stacked one inside the other, so as to reduce storage and shipment space requirements. Preferably, the strainer side wall is made of a first thermoplastic material and the strainer mesh is made of a second thermoplastic material, with the first and second thermoplastic materials being joined together by fusion or other bonding means or methods.

The above and other features of the invention, including various novel details of construction, are described hereinafter.

BRIEF DESCRIPTION OF THE DRAWINGS

The accompanying drawings illustrate a preferred embodiment of the invention, from which its novel features and advantages will be apparent.

In the drawings.

Description Of The Preferred Embodiments

Figure 1:
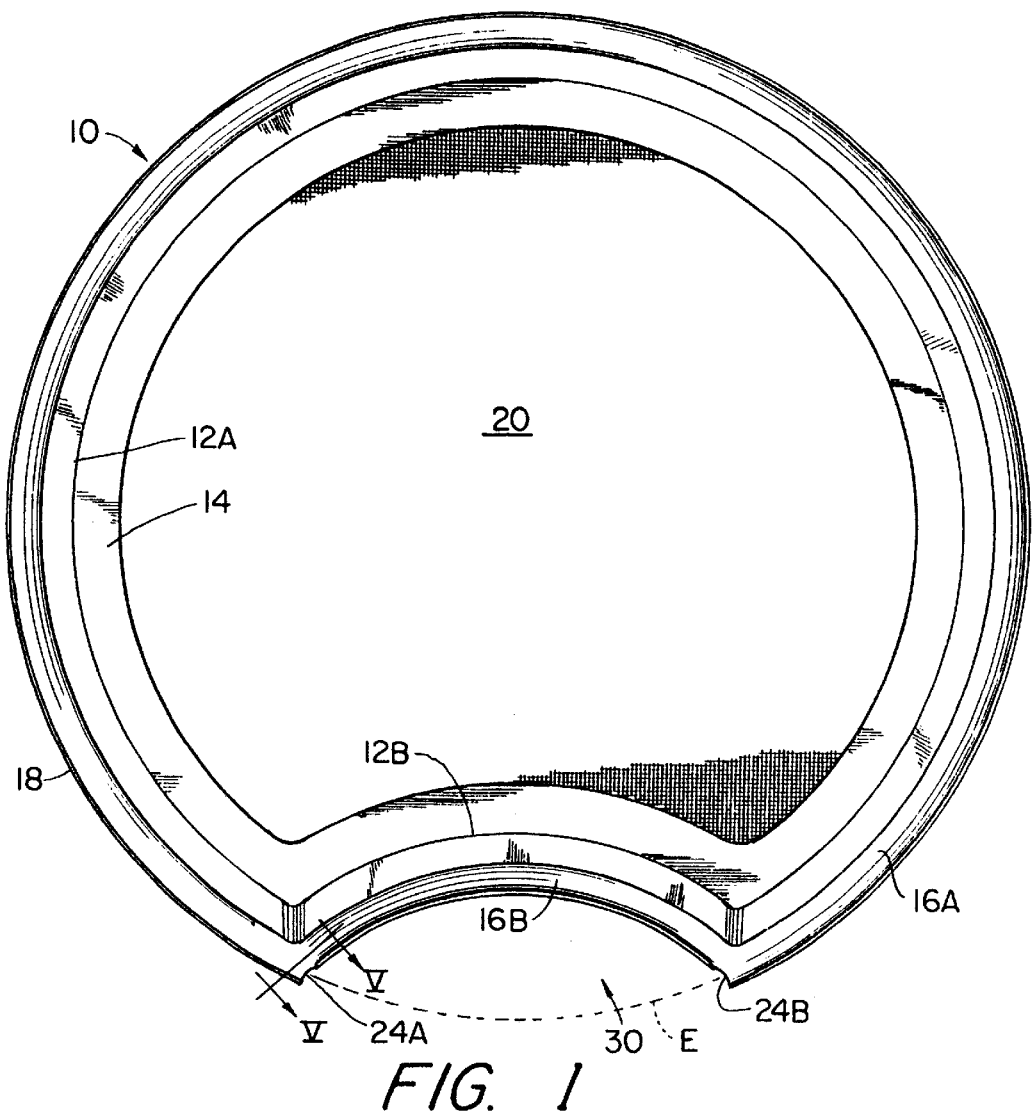
FIG. 1 is a plan view of one form of strainer illustrative of an embodiment of the invention.
Figure 2:
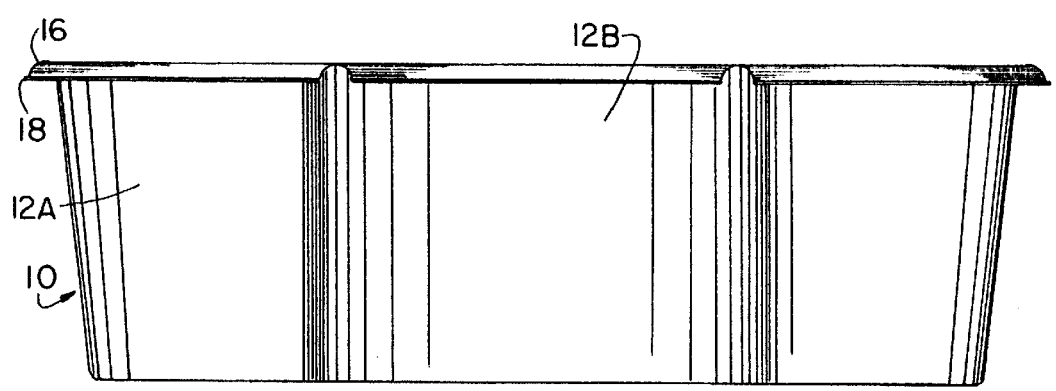
FIG. 2 is a front elevational view of the strainer of FIG. 1.

Referring to the drawings, it will be seen that the illustrative paint strainer comprises a body member identified generally by the numeral 10 and a strainer member identified generally by the numeral 20. The body member 10 comprises a side wall that is tapered inwardly from top to bottom and is characterized by a first portion 12A that is convex in cross-section and a second portion 12B that is concave in cross-section, with the first and second portions being joined to one another so that the side wall is continuous in cross-section. The body member also comprises an inwardly-extending flange 14 at its bottom end, the flange conforming in contour to the cross-sectional contour of the bottom end of the side wall. The strainer member 20 is attached to the flange 14 so as to close off the bottom opening defined by the flange.

Figure 5:
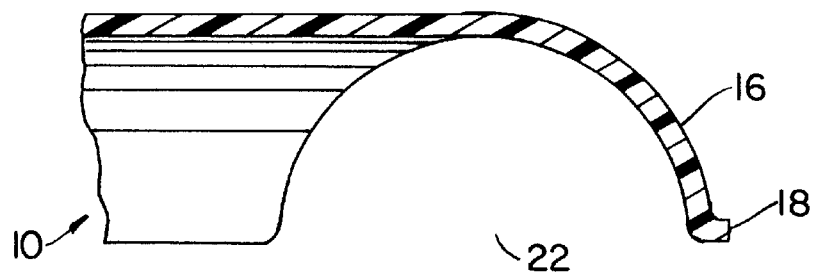
FIG. 5 is a fragmentary cross-sectional view on an enlarged scale taken along line V—V in FIG. 1.

Additionally the body member 10 has an outwardly extending lip identified generally by the numeral 16 which is formed integral with the top end of the side wall and serves as a means for suspending the strainer from the open top end of a container into which paint or some other liquid material is to be strained. Preferably, but not necessarily, the edge of the lip is formed with a bead 18 that extends substantially as a right angle to the longitudinal axis of the strainer (FIG. 5) for strengthening purposes. The lip defines a channel 22 (FIG. 5) for accommodating the-upper end of a container on which the strainer is to be supported. By way of example but not limitation, for a strainer having a body member 10 with an internal diameter of about 11 inches at it top end, it is preferred that the lip define a channel with a maximum width in the range of 0.20" to about 0.5" (so as to accommodate containers having a wall thickness at their upper ends in the range of 0.15" to about 0.40") and a height in the range of 0.35" to about 0.50".

Figure 6:
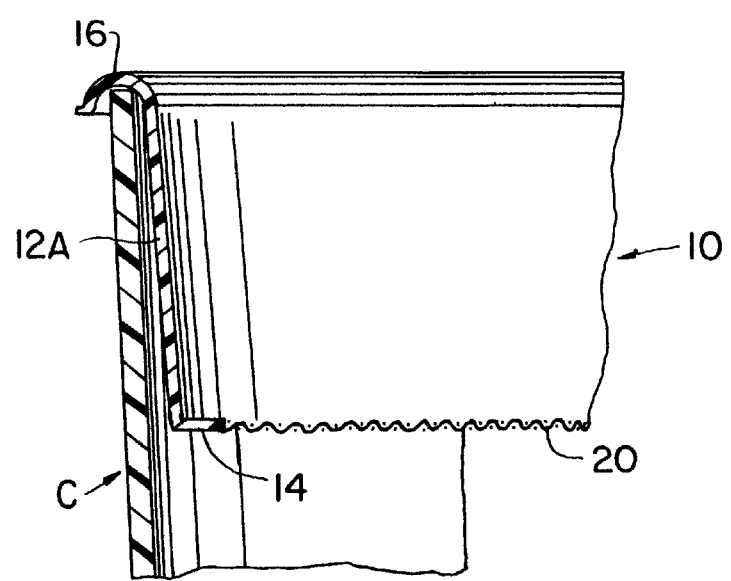
FIG. 6 is a fragmentary cross-sectional view illustrating how the strainer overlaps and is supported by the top edge of a container into which a liquid material such as paint is to be strained.

In this preferred embodiment, the lip comprises a first portion 16A that extend along the top margin of the convex wall portion 12A and a second portion 16B that extends along the top margin of the concave wall portion 12B, except that the lip portion 16B on the second wall portion 12B lip has notches 24A and 24*b* adjacent its junctions with the lip portion 16B on the first wall portion 12A, with the notches providing an open accessway to the channel 22 of lip section 16A in the region of indented wall portion 12B, thereby permitting the strainer to be seated evenly on and suspended from the top end of a container, with the engagement between lip portion 16A and the container being as shown in FIG. 6. In this connection it should be noted that the illustrated embodiment of the strainer is designed to be used with a container that has a circular crosssectional configuration. Accordingly, unless the notches or openings 24A and 24B are provided, the strainer would not sit evenly on the container due to the fact that the lip portion 16B could not accommodate the rim of the container. Stated another way, without the openings 24A and 24*b*, the strainer would not seat properly on the paint container C and possibly become dislocated from the paint container during straining, with potentially messy consequences.

Figure 3:
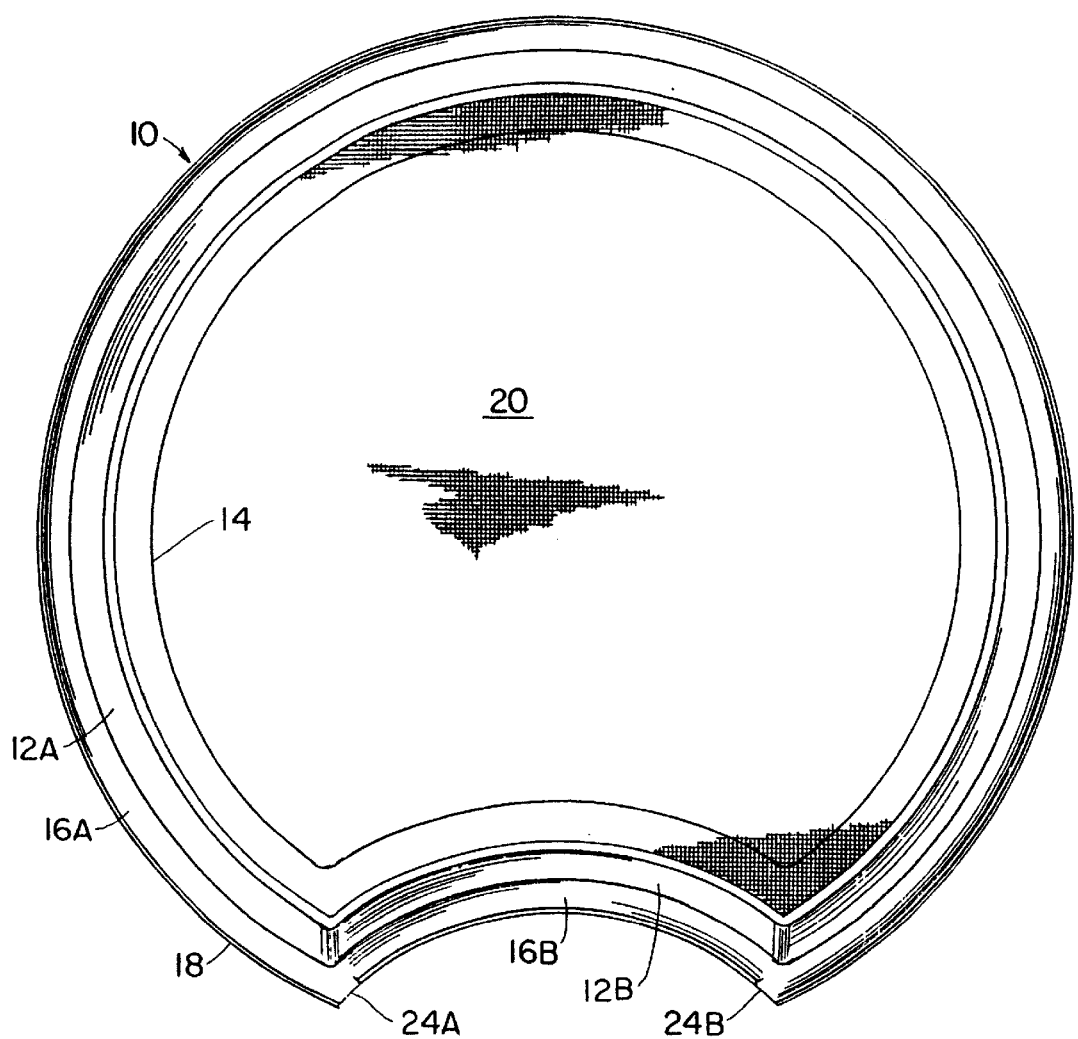
FIG. 3 is a bottom view of the strainer of FIG. 1.
Figure 4:
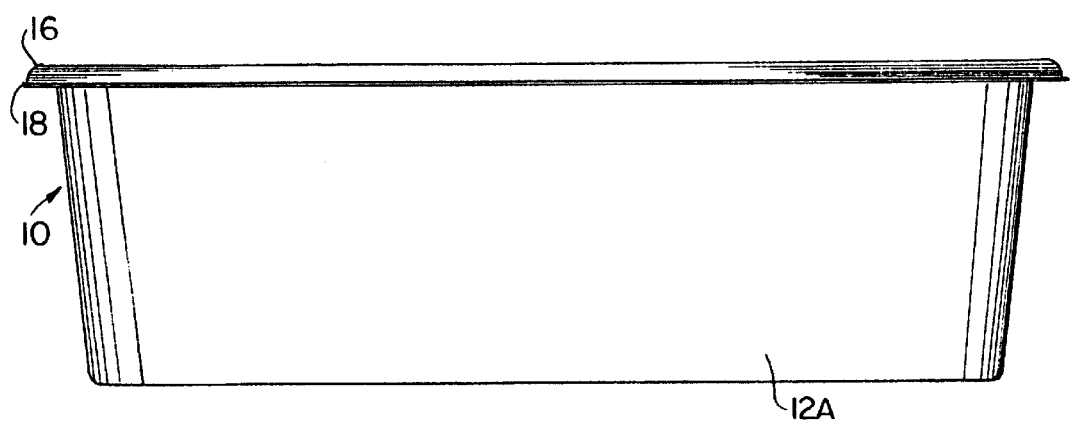
FIG. 4 is a side elevational views taken at a right angle to the viewpoint of FIG. 2.

Referring to FIGS. 1, 3 and 6, the flange 14 has a width (i.e., its radial dimension) that is sufficient to provide an adequate support for the strainer member 20 but does not excessively reduce the effective opening of the strainer at its bottom end. By way of example but not limitation, for a strainer having a body member 10 with an internal diameter of about 11 inches at its top end, it is preferred that the flange 14 have a width in the range of about 0.75" to about 1.0". In this connection, it should be appreciated that in this preferred embodiment the side wall 12A, 12B, flange 14 and lip 16 are made of plastic and molded integrally as a one-piece unit.

The body portion 10 is molded of a first thermoplastic material, such as polyethylene or polypropylene, preferably polyethylene, and the strainer member 20 is made of a second thermoplastic material, preferably nylon. Preferably the body portion 10 is made by vacuum molding. The height of the strainer may be varied according to the size of the container with which it is designed to be used. Preferably the height of the side wall 12A, 12B is selected so as to provide a suitable balance between (a) minimizing the extent to which the strainer detracts from the amount of paint of other liquid that can be accommodated by the container without the strainer protruding into the contents of the container, and (b) maximizing the holding capacity of the strainer so as to minimize the time spent in emptying a container of liquid to be filtered into the strainer. By way of example but not limitation, in the case of a strainer to be used in straining a liquid into a standard 3.5 gallon plastic pail having an inside diameter ranging from of about 11.25" at its top end to about 10" at its bottom end, and an internal height of about 10.0", a strainer total height of about 3½inches has been found appropriate.

The strainer member or mesh 20 preferably is produced by first providing a sheet or web of a mesh material, and then die-cutting the sheet or web to form the strainer member with an edge configuration conforming to that of flange 14.

The strainer member 20 is then bonded to flange 14. This attachment of the strainer member to flange 14 is preferably accomplished by pressing flange 14 and strainer member 20 against one another under the application of heat, causing molten polyethylene to inter-engage and bond to the nylon strands of the mesh of strainer member 20. Alternatively, strainer member 20 may be fixed to flange 14 by a suitable cement or bonding agent.

In a preferred bonding operation, strainer mesh member 20 is engaged with the underside of flange 14, and a heater die at a temperature of about 275° F. is applied to the mesh 20. This temperature has no adverse effect on the nylon mesh, but melts or softens the polyethylene of flange 14 enough to allow it to at least partially infiltrate the pores defined by the nylon mesh, with the result that upon cooling the strands of the mesh are bonded to flange 14 with a bond of sufficient strength to allow the strainer member 14 to carry a substantial weight of liquid to be strained without impairing the strength of the attachment of the strainer member to flange 14. Thus, the two materials are strongly interlocked to provide a strainer of high structural integrity. Such bonding permits the use of a high-quality and relatively inexpensive mesh 20 in conjunction with a body member made of a much less expensive material, such as polyethylene. The finished product is much more competitive, cost-wise, than if the entire strainer were made of premium material, such as nylon or a polyester.

It should be appreciated that that strainer member 20 is substantially planar, but that it may be urged to bow somewhat under the weight and force of paint or other liquid that is poured into the strainer. However, a nylon mesh is capable of withstanding deformation under the loads imposed by the weight of liquid to be strained.

As indicated above, the strainer is designed to be used to strain a liquid by pouring that liquid from one container into another container or receptacle via the strainer. Referring in particular to FIG. 6, in operation, the strainer is inserted into a container or receptacle C having a circular cross-sectional configuration, typically an empty 3.5 gallon or 5 gallon can or pail. The lip portion 16A of the first (convex) wall portion 12A of the strainer is fitted over the top edge E of the container, with the upper edge E residing in the channel 22 of that lip portion and extending through the notches 24A and 24B in the lip portion 12B, as indicated by the dotted line in FIG. 1, and the strainer supported by engagement of lip portion 16A with the upper edge E of the container, so that thereafter the hands of the operator are free to handle the pouring operation. Inasmuch as only a minor portion of the strainer lip extends above the top edge of the receptacle C, the center of gravity of the strainer is below the top end of the receptacle into which paint is being strained, providing a stable positioning of the strainer and reducing the risk of accidentally dislodging the strainer from the receptacle with a resultant spillage of the liquid being strained. It should be noted also in this regard that since the strainer is made of plastic, it has a light weight, so that the combined mass of the container and strainer is substantially the same as that of the container alone, thereby reducing the risk of either the strainer and/or receptacle being tipped over accidentally.

When the strainer is positioned on a container C or other like receptacle as shown in FIG. 6, the concave wall portion 12B strainer and lip portion 16B define an open channel 30 (FIG. 1) that provides access to the contents of the container. Thus, for example, in the case of paint, it is possible to keep the strainer in place while inserting an intake hose for a sprayer apparatus, so that paint spraying using the contents of receptacle C can occur without removing the strainer from the receptacle. Similarly, additional paint can be strained using the in-place strainer without having to remove the sprayer intake hose from container C. In the case where some material other than paint is to be strained, the channel 30 may be used to receive various devices, e.g., a sampling device or a hose or other conduit for conveying the contents of container C to another receptacle or to some special device, e.g., a dispenser in the case of a liquid foodstuff.

It is to be appreciated that the terms "convex" and "convex" are used in a general sense to distinguish between the two wall sections 12A and 12B. In practice, the cross-sectional shape of wall section 12B need not have a circular curvature, but instead, for example, wall section 12B could have a U-shaped or V-shaped cross-sectional configuration. The effective cross-sectional size and shape of the channel 30 may be varied, depending upon the size and number of intake hoses or other implement to be accommodated. For example, channel 50 may be shaped and sized to accommodate a paint brush or small roller (not shown). It should be understood also that the strainer is sized according to the size of the container or receptacle into which paint or other liquid is to be poured via the strainer.

Although the strainer could be made with a side wall that is straight from top to bottom, it is preferred that it be tapered as illustrated and as described above, whereby a number of strainers may be stacked, i.e., nested together, in a relatively small volume. It is contemplated also that strainers having screens of different size mesh may be nested together and packaged and sold as a discrete set, thereby offering the user a choice of mesh porosity. Also, although in the preferred embodiment the screen member is bonded to the underside of the flange 14, it is contemplated that it could be mounted inside of the strainer so that it overlies the flange, and in such event it may still be head bonded although bonding with a cement is also feasible. Another possible modification is to mold the strainer body without any lip portion 16b, since the latter does not help suspend the strainer by engagement with the upper end of a container, but instead merely serves to strength the upper end edge of wall portion 12b against deformation.

The invention offers the advantage of providing a strainer, for paints or other liquid materials, which may be disposed so as to engage an open end of a liquid container and extend into the container from the open end thereof, freeing the hands of an operator for a pouring operation, whereby the paint or other liquid material is strained as it passes through the strainer into the receptacle.

While the invention has been described particularly for use as a strainer for paint, it is obvious that the strainer may be used to strain other liquids. There is thus provided a strainer of extremely low cost in materials and manufacturing requirements, thereby rendering replacement thereof economically favorable.

It is to be understood that the present invention is by no means limited to the particular construction herein disclosed and/or shown in the drawings, but also comprises any modifications or equivalents within the scope of the following claims.

What is claimed is:

1. A strainer device for use in straining and depositing paint or other liquid in an open container having a side wall and a top edge, said strainer device comprising:
    a one-piece thermoplastic body member characterized by an elongate tubular wall having top and bottom ends, an inwardly-extending flange at said bottom end coextensive with the perimeter of said tubular wall, said flange defining a first opening, and an outwardly-extending lip at said top end of said tubular wall that is curved in a direction running from said top end toward said bottom end of said tubular wall, so as to define a first channel for receiving the open top edge of a container of circular cross-section into which the strainer device is inserted, so that said strainer device may be supported by said lip from the top edge of said container, said tubular wall having a cross-sectional configuration along its length that is generally circular except that one portion thereof is indented so as to form a second open channel extending from said top end to said bottom end of said tubular wall, whereby when said strainer device is mounted in a container having a side wall and a top edge so that said lip is engaged with said top edge of the container, said second channel provides a second opening between the strainer device and said side wall of said container for gaining access to the contents of the container without first having to remove the strainer device, said lip terminating at said indented portion so as provide an open accessway to said first channel in the region of said indented portion, and a porous strainer member made of a thermoplastic material extending across said first opening said strainer member being secured to said inwardly-extending flange.

2. A strainer device according to claim 1 wherein said strainer member is made of a different thermoplastic material than said body member.

3. A strainer device according to claim 2 wherein said strainer member is bonded to said flange.

4. A strainer device according to claim 3 wherein said strainer member is fusion bonded to said flange.

5. A strainer device according to claim 1 wherein said strainer member is attached to a bottom side of said flange.

6. A strainer device according to claim 1 wherein said strainer member is attached to a top side of said flange.

7. A strainer device according to claim 1 wherein said tubular wall is tapered inwardly from said top end to said bottom end.

8. A strainer device comprising a one-piece tubular body member that is characterized by a side wall having top and bottom ends that is tapered inwardly from said top end to said bottom end and comprises a first convex wall portion and a second concave wall portion, with said first convex wall portion and said second concave wall portion being joined to one another so that said side wall is continuous in cross-section and so that said second concave wall portion intrudes into a space encompassed by said first convex wall portion and defines a channel exterior of said body that extends for the full length of said side wall, an integral inwardly-extending flange at the bottom end of said side wall, said flange being common to said first convex wall portion and said second concave wall portion of said side wall and defining a bottom opening, a porous screen fixed to said inwardly extending flange so as to close off said bottom opening, and an outwardly extending curved lip formed integral with the top end of said side wall for suspending the strainer device from an open top end of a container into which said strainer device is inserted, said lip being curved in a direction running away from said top end to said bottom end of said side wall, said lip extending along the top margin of said first convex wall portion and terminating at the junctions of the top margins of said first convex wall portion and said second concave wall portion, so as to permit said lip to be seated evenly on a top edge of a container which said straining device is inserted.

9. A strainer device according to claim 8 wherein said body member and said screen are made of a thermoplastic material.

10. A strainer device according to claim 9 wherein said screen is bonded to said flange.

11. A strainer device according to claim 8 wherein said screen is attached to a bottom side of said flange.

12. A strainer device according to claim 9 wherein said screen is attached to a top side of said flange.

* * * * *

UNITED STATES PATENT AND TRADEMARK OFFICE
CERTIFICATE OF CORRECTION

PATENT NO. : 6,247,600 B1
DATED : June 19, 2001
INVENTOR(S) : Joseph J. Sullivan, Jr.

It is certified that error appears in the above-identified patent and that said Letters Patent is hereby corrected as shown below:

Column 7, claim 1,
Line 24, insert a comma after "opening"; and

Column 8, claim 8,
Line 26, insert the word "into" after -- container --.

Signed and Sealed this

Fifteenth Day of January, 2002

Attest:

JAMES E. ROGAN
Attesting Officer
Director of the United States Patent and Trademark Office